United States Patent [19]
Yoda

[11] Patent Number: 5,140,568
[45] Date of Patent: Aug. 18, 1992

[54] PHOTOMAGNETIC RECORDING AND ERASING APPARATUS HAVING MAGNETIC FIELD GENERATING DEVICE INCLUDING A COIL AND A RECORDING MEDIA FACING MEMBER WHICH EXTENDS BEYOND THE COIL

[75] Inventor: Yoshiro Yoda, Tama, Japan
[73] Assignee: Olympus Optical Co., Ltd., Tokyo, Japan
[21] Appl. No.: 389,941
[22] Filed: Aug. 4, 1989

[30] Foreign Application Priority Data
Aug. 12, 1988 [JP] Japan .................. 63-201775

[51] Int. Cl.$^5$ .................. G11B 13/04; G11B 11/12
[52] U.S. Cl. .................. 369/13; 360/114; 360/66; 360/60
[58] Field of Search .................. 369/13; 360/59, 114, 360/125, 66; 365/122

[56] References Cited

U.S. PATENT DOCUMENTS
| | | | |
|---|---|---|---|
| 4,531,170 | 7/1985 | Takei et al. | 360/125 |
| 4,775,909 | 10/1988 | Inoue et al. | 360/125 |
| 4,825,428 | 4/1989 | Toki | 369/13 |
| 4,849,952 | 7/1989 | Shiho | 369/13 |

FOREIGN PATENT DOCUMENTS
| | | | |
|---|---|---|---|
| 57-40761 | 3/1982 | Japan . | |
| 59-119507 | 7/1984 | Japan . | |
| 61-214257 | 9/1986 | Japan . | |
| 62-80810 | 4/1987 | Japan | 360/114 |
| 63-37840 | 2/1988 | Japan | 360/114 |
| 63-55704 | 3/1988 | Japan | 360/114 |
| 64-1102 | 1/1989 | Japan . | |

*Primary Examiner*—Stuart S. Levy
*Assistant Examiner*—Hoa Nguyen
*Attorney, Agent, or Firm*—Frishauf, Holtz, Goodman & Woodward

[57] ABSTRACT

A photomagnetic recording apparatus comprises an optical pickup movable with reference to a photomagnetic recording medium to irradiate an optical beam toward a predetermined region of the photomagnetic recording medium, and a magnetic field-generating mechanism for applying a uniform magnetic field to that predetermined region of the optical magnetic recording medium which is irradiated with the optical beam. The magnetic field-generating mechanism includes a yoke, at least one arm portion supported by the yoke, a coil winding held by the at least one arm portion, and a recording medium-facing member supported by the at least one arm and having end portions extending from the coil winding in the direction in which the optical pickup is movable. The yoke, at least one arm portion, and the recording medium-facing member are made from a magnetic material.

8 Claims, 4 Drawing Sheets

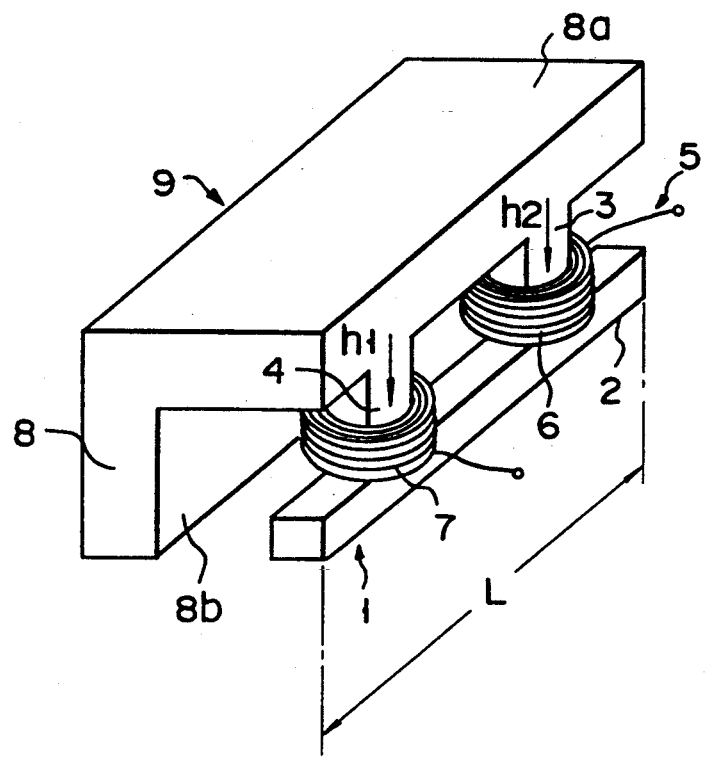
F I G. 5
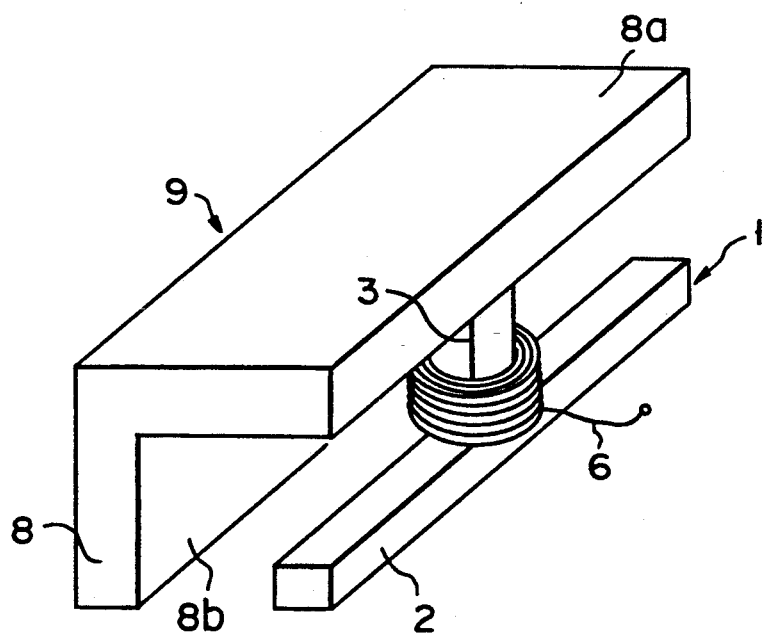
F I G. 6

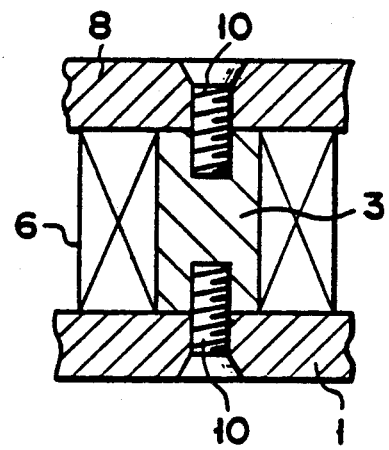
F I G. 7A
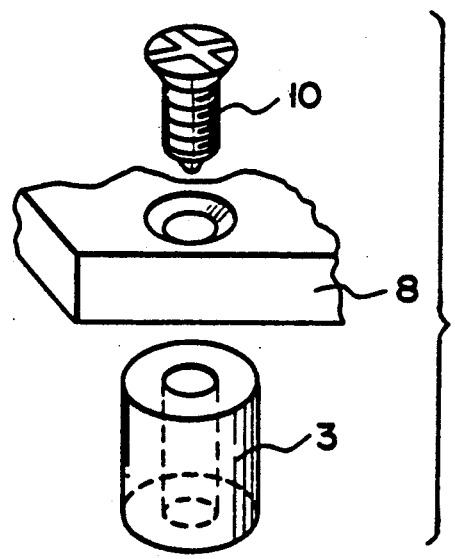
F I G. 7B

PHOTOMAGNETIC RECORDING AND ERASING APPARATUS HAVING MAGNETIC FIELD GENERATING DEVICE INCLUDING A COIL AND A RECORDING MEDIA FACING MEMBER WHICH EXTENDS BEYOND THE COIL

BACKGROUND OF THE INVENTION

1. Field of the Invention

The present invention relates to a photomagnetic recording apparatus which is provided with a magnetic field-generating device for generating a magnetic field required for the recording and/or the erasing of information.

2. Description of the Related Art

FIG. 1 is a view schematically illustrating a conventional photomagnetic recording apparatus. A magnetic recording medium 21 employed in this apparatus has a magnetic film which is formed thereon for example by use of deposition and has magnetic anisotropy in a direction perpendicular to the surface thereof. The magnetic film is initially magnetized in one direction perpendicular to the surface of the magnetic recording medium. The direction of this magnetization is reversed if the magnetic film is irradiated with an optical beam by an optical pickup 20 while being simultaneous subjected to, (by a magnetic field-generating device 19), a magnetic field whose direction is opposite to that of the initial magnetization of the magnetic film. The recording of information is carried out by reversing the direction of the magnetization in accordance with the information. The information, thus recorded, can be erased by irradiating the magnetic film with an optical beam while simultaneously applying to the film a magnetic field whose direction is the same as that of the initial magnetization.

Published Unexamined Japanese Patent Applications No. 57-40761 and No. 59-119507 disclose examples of the magnetic field-generating device which can be employed in the above apparatus.

FIG. 2 shows the example disclosed in Published Unexamined Japanese Patent Application No. 59-119507; and is an enlarged view partially illustrating a magnetic field-generating device 19 of the photomagnetic recording apparatus shown in FIG. 1. Referring to FIG. 2, magnetic field-generating device 19 comprises a magnetic circuit made up of a main magnetic pole 11 and a yoke 18, and coil 15 formed around the magnetic circuit. To prevent a magnetic field from decreasing in intensity at the end of main magnetic pole 11, length L of main pole 11 is set to be greater than the irradiation range A (FIG. 1) of an optical beam so that the main pole 11 covers the irradiation range A.

In the case of the example shown in FIG. 2, coil 15 is provided throughout the whole length L of main magnetic pole 11. With this construction, the series resistance of coil 15 becomes higher in proportion to the number of turns of coil 15, so that coil 15 generates a large amount of heat.

In addition, that portion of main magnetic pole 11 around which coil 15 is provided can have a rectangular or an oval cross section. With this construction, it is difficult to obtain a regularly-wound coil. Since such a coil is formed automatically by machines in the usual case, the cross section of the portion around which coil 15 is formed should be as circular as possible. If the cross section is circular, the coil can be wound with uniform tension, thus enabling the coil to be formed very regularly. If the cross section is rectangular or oval, however, the coil cannot be formed with uniform tension, so that the resultant coil is likely to become loose at the portion indicated by $a$ in FIG. 2.

FIG. 3 shows the example disclosed in Published Unexamined Japanese Patent Application No. 57-40761. The magnetic field-generating device of this example is obtained by dividing the main magnetic pole 11 shown in FIG. 2 into a plurality of magnetic pole elements $11a$, $11b$, and $11c$. These magnetic pole elements are linearly arranged, and one insulated wire 15 is wound around them in a series fashion. Length L indicated in FIG. 3 is determined such that it substantially corresponds to the irradiation range A of an optical beam.

In the case of the example shown in FIG. 3, the magnetic pole is divided into a plurality of elements and these elements are arranged in the direction in which an optical beam is irradiated. With this construction, it is impossible to obtain a uniform magnetic field distribution as can be seen from the graph shown in FIG. 4. The magnetic field distribution in FIG. 4 is depicted as having a sinusoidal wave form throughout length L corresponding to the irradiation range of an optical beam.

Let it be assumed that the minimum magnetic field required for the recording or erasing of information with respect to magnetic recording medium is denoted by Hmin. In this case, the magnetic field intensity at the lowest point in L of the FIG. 4 graph should be Hmin or more. Therefore, the magnetic field intensities at the other points are considerably higher than Hmin. As a result, a large amount of current is consumed in vain in the case of the example shown in FIG. 3.

SUMMARY OF THE INVENTION

Accordingly, it is an object of the present invention to provide a photomagnetic recording apparatus comprising a magnetic field-generating device, wherein the coil has low series resistance to suppress heat generation, is wound very regularly, and does not consume unnecessary current.

BRIEF DESCRIPTION OF THE DRAWINGS

FIG. 5 is a perspective view of the magnetic field-generating device employed in the photomagnetic recording apparatus according to the first embodiment of the present invention;

FIG. 6 is a perspective view of the magnetic field-generating device employed in the photomagnetic recording apparatus according to the second embodiment of the present invention;

FIG. 7A is a sectional view showing one possible state in which a spool member, a yoke, and a main magnetic pole are coupled together by adhesion;

FIG. 7B is a perspective view showing another possible state in which the spool member, the yoke and the main magnetic pole are coupled together;

DETAILED DESCRIPTION OF THE PREFERRED EMBODIMENTS

A description will now be given of the photomagnetic recording apparatuses embodying the present invention, with reference to the accompanying drawings.

Figure 1:
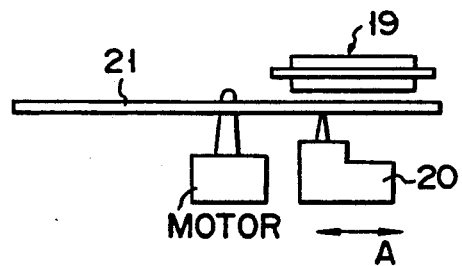
FIG. 1 is a view schematically illustrating a conventional photomagnetic recording apparatus.
Figure 2:
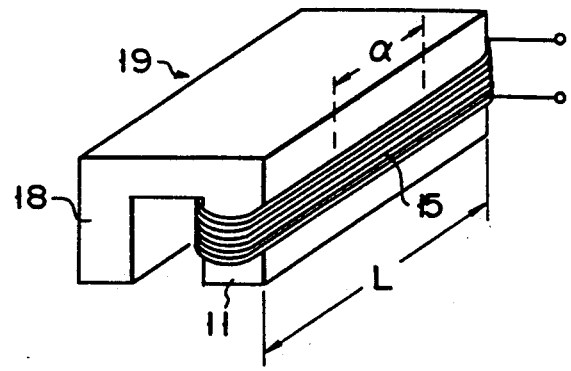
FIG. 2 is a perspective view of one conventional magnetic field-generating device for use in the apparatus shown in FIG. 1.
Figure 3:
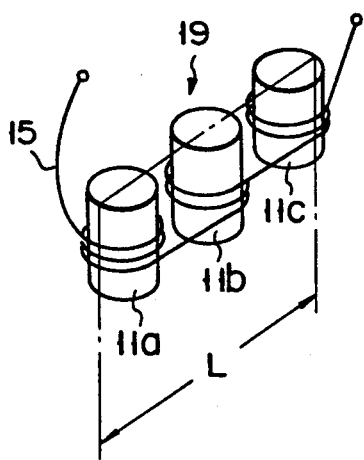
FIG. 3 is a perspective view of another conventional magnetic field-generating device for use in the apparatus shown in FIG. 1.
Figure 4:
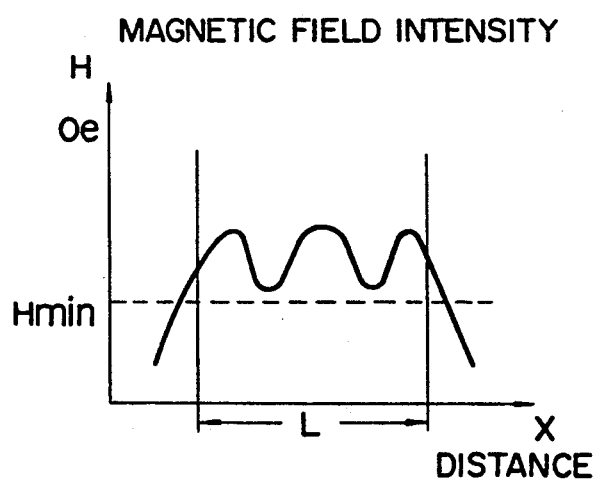
FIG. 4 is a graph showing the distribution of the magnetic field generated by the magnetic field-generating device shown in FIG. 3.

Roughly speaking, the photomagnetic recording apparatus of the present invention is similar to that shown in FIG. 1, except for the construction of the magnetic field-generating device. Therefore, explanation of the similar portions will be omitted, and reference will be made only to those portions unique to the present invention.

In FIG. 5, reference numeral 9 denotes the magnetic field-generating device according to the first embodiment of the present invention. This magnetic field-generating device comprises yoke 8, two spool members 3 and 4 around which a coil is to be provided, recording medium-facing portion 1 (i.e., a main magnetic pole), and coil winding 5.

Yoke 8, spool members 3 and 4, and main magnetic pole 1 are formed of a magnetic material, and are integrally formed as one piece. Yoke 8 includes horizontal plate 8a having a predetermined thickness, and wall portion 8b perpendicularly extending from one side of horizontal plate 8a. Wall portion 8b serves to prevent leakage of magnetic flux. Two spool members 3 and 4, around which a coil is to be formed, are attached to the other side of horizontal plate 8a in a manner to face wall portion 8b. Spool members 3 and 4 are spaced apart from each other by a predetermined distance. In the first embodiment, the spool members are constituted by two arm potions, but only one arm portion may be provided, as in the second embodiment shown in FIG. 6.

The cross section of each of spool members 3 and 4 can be formed to have a critical area which does not magnetically saturate when current is supplied to the coil. More specifically, magnetic flux density B has a saturation region with respect to magnetic field H, and satisfies the relation $\Phi = BS$ with respect to magnetic flux $\Phi$ and areas S through which magnetic flux $\Phi$ passes. Therefore, magnetic flux $\Phi$ can be increased by increasing magnetic flux density B or widening area S.

If saturated, magnetic flux density B cannot be increased even if the magnetic field is intensified by supplying more current to the coil. In view of the problem of heat generation, area S should be as small as possible. Therefore, in order to obtain the necessary magnetic flux $\Phi$ with high efficiency, it is preferable that the spool members be located in the region where the magnetic flux density does not saturate. Therefore, the cross sectional area can be reduced until the necessary magnetic flux density $\Phi$ is obtained, while maintaining the state where the magnetic flux density does not saturate.

Main magnetic pole 1, formed as a single body and having surface 2 facing the magnetic recording medium, is located below the arm portions. Length L of main magnetic pole 1 is set to be greater than the movement range of the optical pickup so that magnetic pole 1 covers the irradiation range of an optical beam, and thus a uniform magnetic field is applied to the surface of the magnetic recording medium. In FIG. 5, main magnetic pole 1 is depicted as a quadrangular prism, but it may have any kind of shape as long as it can apply a uniform magnetic field. The surface of the projected part of wall portion 8b and surface 2 are substantially in the same plane, so as to efficiently prevent leakage of magnetic flux.

One insulated wire 5 is wound around both spool members 3 and 4, thereby constituting coil windings 6 and 7. Insulated wire 5 is wound in such a manner that magnetic fields h1 and h2 which are of the same direction are generated, as is shown in FIG. 5, when a current is supplied through wire 5. To permit wire 5 to be wound with uniform tension, it is preferable that coil windings 6 and 7 be hollow and have a circular, oval, or similar cross section. In other words, the cross section of spool members 3 and 4 is not limited to the rectangular one illustrated in the drawings. If the coil windings 6 and 7 are hollow and have a circular or oval cross section, insulated wire 5 can be wound around them with uniform tension.

In the first embodiment mentioned above, yoke 8, spool members 3 and 4, and main magnetic pole 1 are integrally formed as one piece. However, they may be individual members and assembled together.

FIG. 7A illustrates a case where yoke 8, spool member 3, and main magnetic pole 1, which are prepared individually, are coupled together by adhesion, after coil 5 is provided around spool member 3. Before these members are coupled together, a hole is formed in both yoke 8 and main magnetic pole 1, and then yoke 8 and main magnetic pole 1 are secured to each other by means of screw 10. Alternatively, a hole may be formed in both yoke 8 and main magnetic pole 1, and spool member 3 having tapered ends may be fitted into the holes of yoke 8 and main magnetic pole 1. Further, spool member 3 having tapered ends may be inserted through the holes, and the portions projected from the holes may be crushed, for reliable coupling.

FIG. 7B illustrates a case where hollow spool member 3 is employed. In this case, screw 10 is formed of the same material as that of yoke 8 and main magnetic pole 1, and its length is determined such that the hollow region of spool member 3 is entirely filled with screw 10. With this construction, the cross sectional area of the spool member remains substantially unchanged. Therefore, the intensity of a magnetic field to be generated is substantially the same as that of a magnetic field to be generated in the case where yoke 8, spool member 3, and main magnetic pole 1 are integrally formed as one piece.

In magnetic field-generating device 9 having the above construction, magnetic fields h1 and h2 of the same direction are generated when a current is supplied to coil windings 6 and 7. As a result, main magnetic pole 1 is polarized in the vertical direction, and a uniform magnetic field is generated from surface 2 facing a magnetic recording medium. Thus, the magnetic recording medium is applied with a uniform magnetic field. The direction in which the magnetic recording medium is magnetized must be reversed between the case where information is recorded and the case where the information is erased. The reversion of the magnetization direction is easily attained by changing the direction in which a current flows through the coil.

Figure 8:
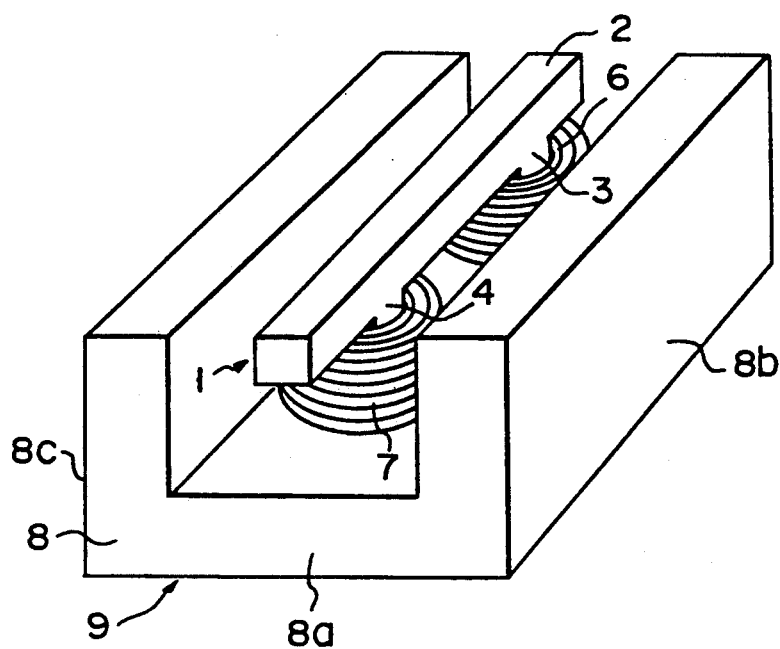
FIG. 8 is a perspective view of the magnetic field-generating device employed in the photomagnetic recording apparatus according to the third embodiment of the present invention.

FIG. 8 shows a magnetic field-generating device according to the third embodiment. According to this embodiment, wall portions 8b and 8c similar to each other are formed on the respective sides of horizontal plate 8a, which is of the same type as that employed in the first embodiment. Wall portions 8b and 8c are projected perpendicularly from horizontal plate 8a, and face each other in parallel to form a substantially U shaped yoke. At a point substantially intermediate between wall portions 8b and 8c, main magnetic pole 1 and arm portions constituting spool members 3 and 4 are provided in a such manner that they are parallel to wall portions 8b and 8c. Generally speaking, the magnetic flux of a magnet is radiately emitted from the N pole and are incident on the S pole. As may be understood from this, most of the magnetic flux generated in the third embodiment are directed toward yoke 8 (namely wall portion 8b and 8c). Wall portion 8b and 8c has main magnetic pole 1 therebetween. As a result, leakage of magnetic fluxes, i.e., loss of magnetic fluxes is prevented very effectively.

Figure 9:
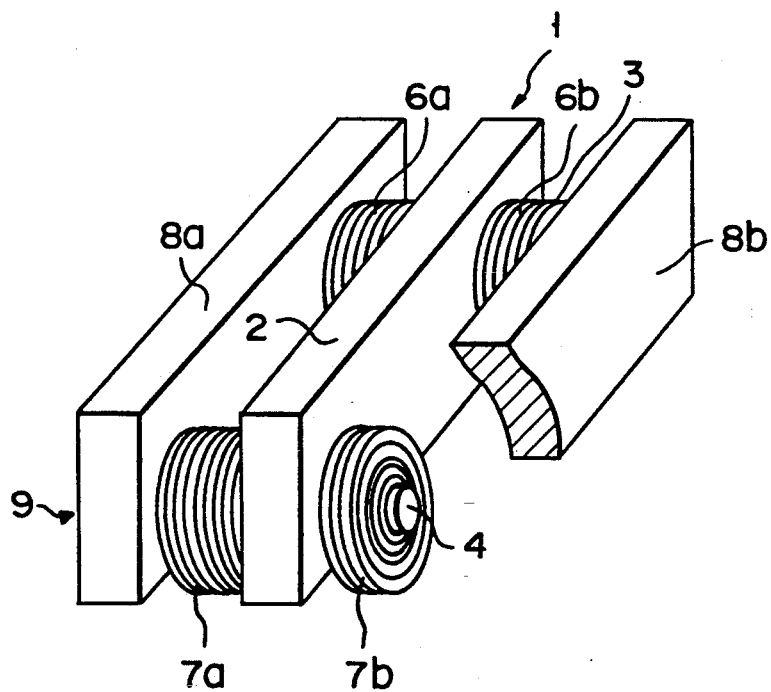
FIG. 9 is a perspective view of the magnetic field-generating device employed in the photomagnetic recording apparatus according to the fourth embodiment of the present invention.

FIG. 9 shows a magnetic field-generating device according to the fourth embodiment. For easy understanding, the Figure is partially cutaway. As is shown, the magnetic field-generating device according to the fourth embodiment comprises two plate-like yokes 8a and 8b, one plate-like main magnetic pole 1, and two cylindrical spool members 3 and 4 (or magnetic shafts). Shaft 3 is hidden by coils 6a and 6b in the FIG. 9. Yokes 8a and 8b and main magnetic pole 1 have substantially the same shape. Two spool members 3 and 4 are spaced from each other by a predetermined distance, and are inserted through main magnetic pole 1 perpendicularly thereto. To the ends of spool members 3 and 4, yoke 8a and Yoke 8b are attached by use of an adhesive or screws, such that they are parallel to main magnetic pole 1. The three plates, namely, two yokes and one main magnetic pole, are arranged in parallel to one another, with a predetermined distance maintained therebetween. The two spool members, to which the three plates are secured, have coils 6a, 6b, 7a, and 7b located between the plates. With this construction, magnetic field-generating device 9 is low and narrow (i.e., it does not occupy much installation area). In addition, since device 9 employs plates of the same shape and spool members of the same shape, it is easy to fabricate or work.

What is claimed is:

1. A photomagnetic recording and erasing apparatus for recording information on and erasing information from a photomagnetic recording medium, comprising:
    optical pickup means movable in a predetermined direction with reference to said photomagnetic recording medium for irradiating said photomagnetic recording medium with an optical beam in a predetermined region of said photomagnetic recording medium; and
    magnetic field-generating means for applying a substantially uniform magnetic field to said predetermined region of said photomagnetic recording medium which is irradiated with said optical beam;
    said magnetic field-generating means including:
    a yoke formed of a magnetic material;
    spool means having at least two arm portions supported by the yoke;
    coil means wound around and held by each of said at least one arm portions;
    a recording medium-facing member supported by said at least two arm portions and having a surface facing said photomagnetic recording medium which extends beyond said coil means in said predetermined direction of movement;
    said at least two arm portions of said spool means being supported by said yoke, said two arm portions being spaced from each other by a predetermined distance, wherein said yoke includes a horizontal plate, and a first wall portion projected from the horizontal plate in a plane substantially perpendicular to said horizontal plate, and said two arm portions of said spool means being supported by said horizontal plate in a plane perpendicular to said horizontal plate and parallel to said first wall portion; and
    said recording medium-facing member including end portions which extend away from said arm portions in said predetermined direction in which the optical pickup means is movable.

2. A photomagnetic recording and erasing apparatus according to claim 1, wherein:
    said two arm portions comprises first and second arm portions; and
    said coil means comprises first and second coils, each respectively held by one of said first and second arm portions.

3. A photomagnetic recording and erasing apparatus according to claim 1, wherein:
    said yoke further includes a second wall portion which is projected in a plane perpendicular to said horizontal plate and parallel to said first wall portion to form with said horizontal plate a substantially U-shaped yoke, with a predetermined distance maintained between the wall portions of said U-shaped yoke; and
    said spool means is positioned between said wall portions of said U-shaped yoke and attached to said horizontal plate.

4. A photomagnetic recording and erasing apparatus according to claim 1, wherein:
    said yoke includes first and second parallel plates, separated by a predetermined distance therebetween;
    said recording medium-facing member comprises a third plate positioned between and parallel to said first and second plates; and
    said spool means includes a plurality of arm portions which extend perpendicularly from said first and second parallel yoke plates to hold and support said third plate therebetween.

5. A photomagnetic recording and erasing apparatus for recording information on and erasing information from a photomagnetic recording medium, comprising:
    optical pickup means movable in a predetermined direction with reference to said photomagnetic recording medium for irradiating said photomagnetic recording medium with an optical beam in a predetermined region of said photomagnetic recording medium; and
    magnetic field-generating means for applying a substantially uniform magnetic field to said predetermined region of said photomagnetic recording medium which is irradiated with said optical beam;
    said magnetic field-generating means including:
    a yoke formed of a magnetic material;
    spool means having at least two arm portions supported by the yoke;

coil means wound around and held by said at least two arm portions;

a recording medium-facing member supported by said spool means and having a surface facing said photomagnetic recording medium which extends beyond said coil means in said predetermined direction of movement; and the cross-sectional area of said coil means being smaller than the cross-sectional area of said recording medium-facing member.

6. A photomagnetic recording and erasing apparatus for recording information on and erasing information from a photomagnetic recording medium, comprising:

optical pickup means movable in a predetermined direction with reference to said photomagnetic recording medium for irradiating said photomagnetic recording medium with an optical beam in a predetermined region of said photomagnetic recording medium; and magnetic field-generating means for applying a substantially uniform magnetic field to said predetermined region of said photomagnetic recording medium which is irradiated with said optical beam;

said magnetic field-generating means including:

a yoke formed of a magnetic material;

spool means supported by said yoke;

coil means held by said spool means; and a recording medium-facing member supported by said spool means and having a surface facing said photomagnetic recording medium which extends beyond said coil means in said predetermined direction of movement;

said spool means including at least two arm portions which are supported by said yoke, wherein said yoke includes a horizontal plate, and a first wall portion projected in a plane perpendicular to said horizontal plate, and said spool means including said at least two arm portions which are supported by said yoke in a plane perpendicular to said horizontal plate and parallel to said first wall portion; and said coil means including coils winding around said at least two arm portions; and the cross-sectional area of said coil means being smaller than the cross-sectional area of said recording medium-facing member.

7. A photomagnetic recording and erasing apparatus according to claim 6, wherein said coils include separate coils each is mounted around each of said at least two arm portions of said spool means.

8. A photomagnetic recording and erasing apparatus for recording information on and erasing information from a photomagnetic recording medium, comprising:

optical pickup means movable in a predetermined direction with reference to said photomagnetic recording medium for irradiating said photomagnetic recording medium with an optical beam in a predetermined region of said photomagnetic recording medium; and magnetic field-generating means for applying a substantially uniform magnetic field to said predetermined region of said photomagnetic recording medium which is irradiated with said optical beam;

said magnetic field-generating means including:

a yoke formed of a magnetic material;

a spool member having at least two arm portions supported by said yoke;

a coil winding mounted around and held by each of said at least two arm portions;

a recording medium-facing member supported by said spool member and having end portions extending from said at least two arm portions beyond said coil winding in said predetermined direction of movement in which the optical pickup is movable; and the cross-sectional area of said coil windings being respectively smaller than the cross-sectional area of said recording medium facing member.

* * * * *